Dec. 18, 1962 I. REHMAN ETAL 3,069,511

MOUTHPIECE POSITIONING AND MOUNTING APPARATUS

Original Filed Sept. 30, 1958 4 Sheets-Sheet 1

INVENTOR.
IRVING (NMI) REHMAN
DALE C. GIBSON
BY

Paul [signature]
ATTORNEYS

Dec. 18, 1962 I. REHMAN ETAL 3,069,511

MOUTHPIECE POSITIONING AND MOUNTING APPARATUS

Original Filed Sept. 30, 1958 4 Sheets-Sheet 2

INVENTOR.
IRVING (NMI) REHMAN
DALE C. GIBSON
BY

Paul W. Critchlow
ATTORNEYS

Dec. 18, 1962 I. REHMAN ETAL 3,069,511

MOUTHPIECE POSITIONING AND MOUNTING APPARATUS

Original Filed Sept. 30, 1958 4 Sheets-Sheet 3

INVENTOR.
IRVING (NMI) REHMAN
DALE C. GIBSON
BY

Paul W. Critchlow
ATTORNEYS

Dec. 18, 1962 I. REHMAN ETAL 3,069,511

MOUTHPIECE POSITIONING AND MOUNTING APPARATUS

Original Filed Sept. 30, 1958 4 Sheets-Sheet 4

INVENTOR.
IRVING (NMI) REHMAN
DALE C. GIBSON
BY
Paul W. Fitzhelm
ATTORNEYS

United States Patent Office 3,069,511
Patented Dec. 18, 1962

3,069,511
MOUTHPIECE POSITIONING AND MOUNTING APPARATUS

Irving Rehman, 5153 Tampa Ave., Tarzana, Calif., and Dale C. Gibson, 1977 Willow St., San Diego, Calif.

Original application Sept. 30, 1958, Ser. No. 764,459, now Patent No. 3,030,627, dated Apr. 24, 1962. Divided and this application Feb. 29, 1960, Ser. No. 12,495
4 Claims. (Cl. 179—156)
(Granted under Title 35, U.S. Code (1952), sec. 266)

This is a divisional application of application Serial No. 764,459, filed September 30, 1958, titled Multi-Duty Helmet.

The invention described herein may be manufactured and used by or for the Government of the United States of America for governmental purposes without the payment of any royalties thereon or therefor.

This invention relates to an improved mouthpiece positioning and mounting apparatus and more particularly to an improved mouthpiece positioning and mounting apparatus of the type mounted on a helmet separately and independently from any ear defender or earphone mountings.

In the prior art, mouthpiece mountings on communications helmets were generally one of two types. The first type involved a relatively fixed mounting which strapped the microphone mouthpiece across the mouth of the wearer. This type had the obvious disadvantages of being extremely difficult to adjust, i.e., the adjustment of a buckle arrangement was usually necessary, and not allowing for an effective and comfortable standby position. In the alternative, this type hung loose across the chest of the wearer which necessitated lifting the microphone mouthpiece each time use was contemplated. The other prior art type generally involved a swivel or swinging type of microphone mouthpiece hung on a boom from the earphones or the earphone adjustment mechanism. This resulted in counteraction between the microphone mouthpiece adjustment and earphone adjustment which had obvious disadvantages and further did not provide for a practical standby position. A further disadvantage of both prior art types lay in the ineffective noise shielding. Thus, the wearer in order to be heard in an environment having high ambient noise had to physically hold the microphone and noise shield, if used, against his mouth or cup both hands, for extremely noisy environments, around the microphone.

It is thus an object of the present invention to provide an improved mouthpiece apparatus of the type utilized with a helmet that is mounted and adjusted independently of any other auxiliary equipment utilized therewith.

Another object is the provision of an improved microphone mouthpiece apparatus of the type utilized with a communications helmet which is comfortable to the wearer and provides for effective noise shielding.

A further object of the invention is to provide an improved mouthpiece apparatus of the type utilized with a helmet in which effective and easily adjustable "use" or "standby" positions are provided.

According to one form of the invention, a microphone is located within a noise-shielding mouthpiece having an acoustical seal type of lip adapted to fit around and over the mouth of the wearer. The mouthpiece is suspended by a U-shaped boom which is mounted to the helmet over the forehead of the wearer. The microphone and noise shield mouthpiece are carried through a friction sliding coupling on each side of the ends of the boom which allows for a length adjustment. The noise-shield mouthpiece itself is coupled to the friction-slide unit through a ball and socket joint allowing for movement in all planes. The boom is attached at the front of the helmet on a mounting block equipped with a releasable clamping lock for locking the boom in any selected position. Thus, the boom can be swung forward and up, to place the noise shield and microphone at a standby position on top of the helmet, and locked in this position when desired.

Another novel feature of this microphone apparatus lies in a completely functional positioning of the press-to-talk switch button. The prior art press-to-talk buttons are generally located on the side, the position of which serves no useful function. The present invention contemplates use in an environment with high ambient acoustic noise so the push button is placed on the front of the microphone mount and protrudes through the noise shield opposite the mouth of the wearer. Thus, pushing the button to actuate the press-to-talk switch automatically moves the noise shield snugly around the mouth and against the face of the wear which effects a good acoustical noise shield. It is thus seen that the disadvantages outlined above of the prior art microphones adjusting and mounting apparatus have been overcome by the instant invention.

In other contemplated uses and environments of the instant invention, the microphone mouthpiece could be replaced with breathing apparatus or a bacteria filter in medical applications, for example.

Other objects and many of the attendant advantages of this invention will be readily appreciated as the same becomes better understood by reference to the following detailed description when considered in connection with the accompanying drawings wherein.

Figure 6A:
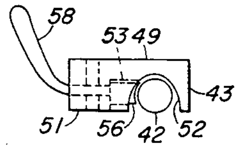
Figure 6B:
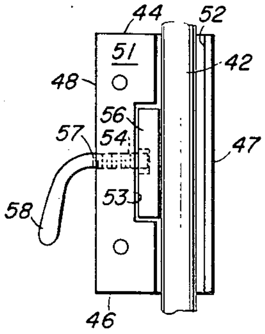
Figure 7:
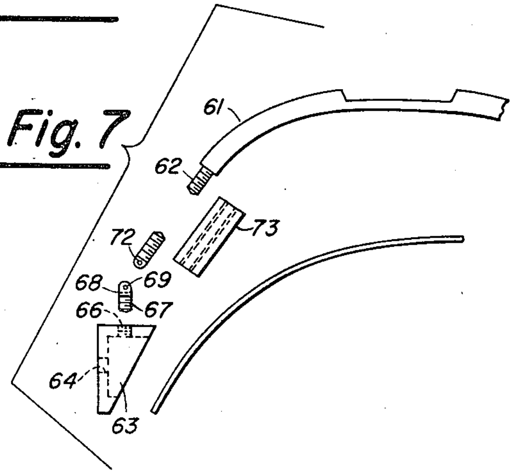
Figure 8:
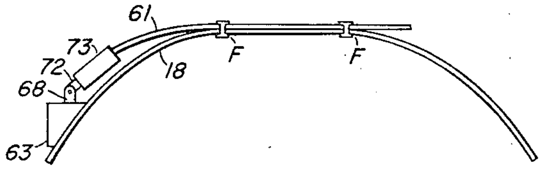
Figures 9, 10, 11:
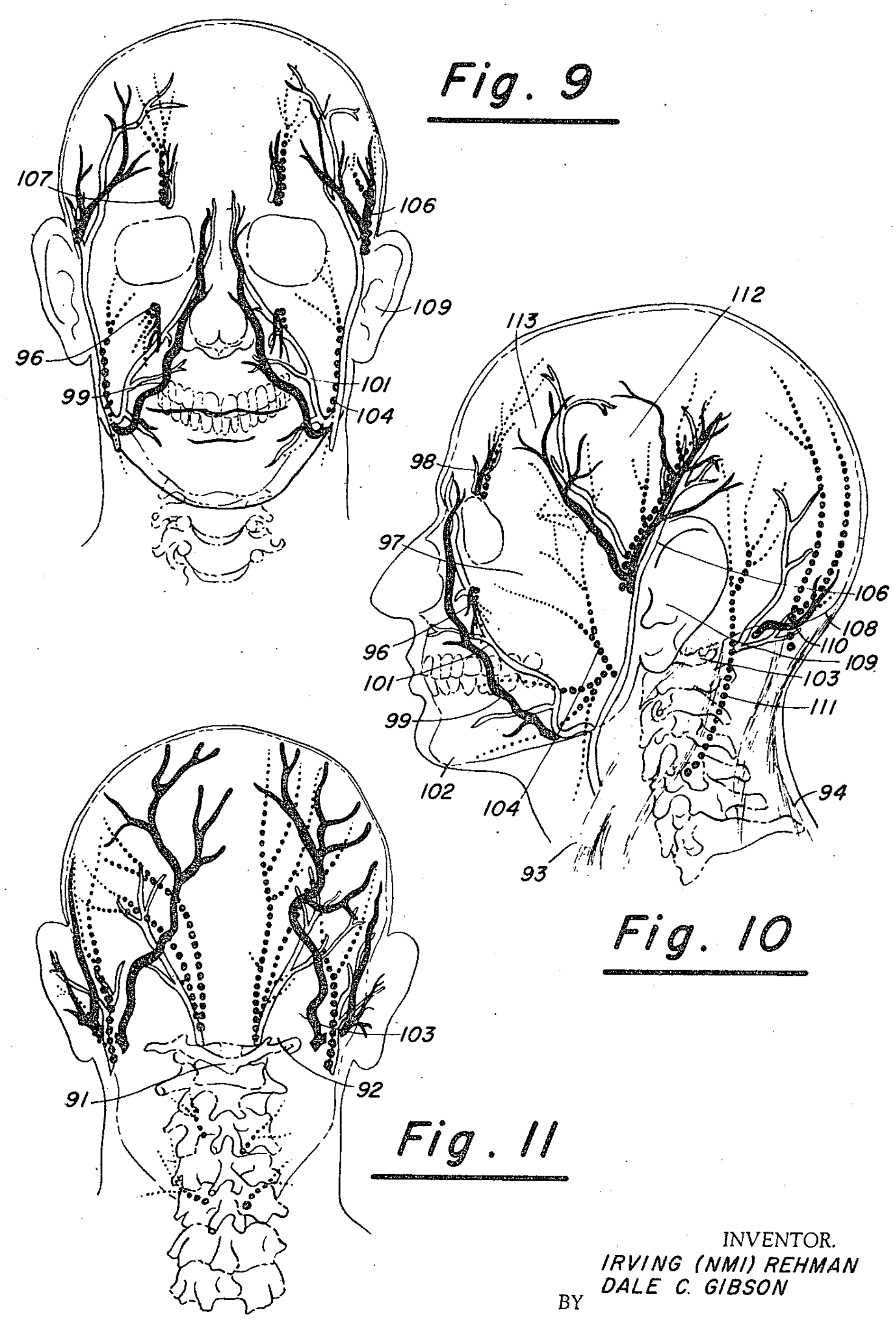

FIGS. 6*a* and 6*b* show details of the microphone boom adjustment;

FIG. 7 shows a modification of the helmet of this invention without the auxiliary equipment attached;

FIG. 8 shows an exploded detail of FIG. 7;

FIG. 9 is an anterior view of a human head showing the arteries, veins, and nerves;

FIG. 10 is a lateral view of a human head showing arteries, veins, and nerves; and FIG. 11 is a posterior view of the human head showing arteries, veins, and nerves.

Figure 1:
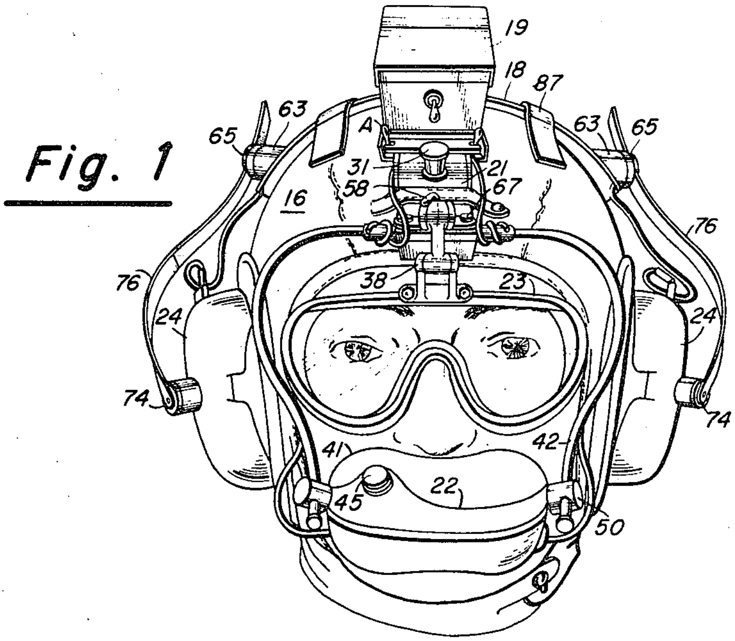
FIG. 1 shows the present invention utilized as a radio communications' helmet.
Figure 2:
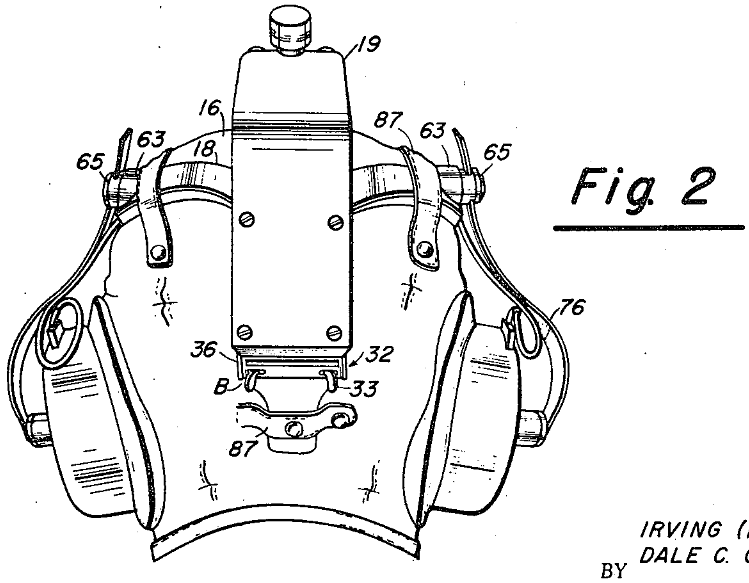
FIG. 2 shows the embodiment of FIG. 1 from the posterior view.
Figure 3:
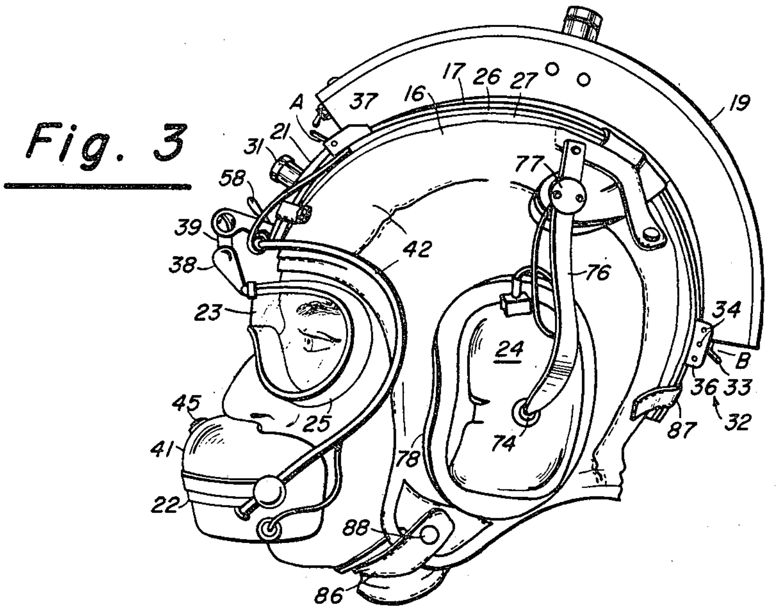
FIG. 3 shows the embodiment of FIG. 1 from the lateral view.

Referring now to the drawings, and particularly to FIGS. 1 to 3, a general description of the present invention will be given followed by a more detailed description of the individual features. FIGS. 1 to 3 illustrate a preferred embodiment of the present invention consisting basically of an individually fitted canvas head covering 16 on which is attached a flexible member 17 extending fore-and-aft along the canvas head covering 16, and an extension member 18 extending transversally to member 17 along the covering 16. A rigid member 19 is pivotally attached to member 17 at a forward point A and slideably attached at an afterpoints B. This member is also utilized as a transceiver housing. Attached to an adjustable extension, 21 of the flexible member 17 are a noise shield and microphone assembly 22 and a visor 23, both of which are adjustable. Hearing defenders and transducers 24 are adjustably attached to the transverse extension member 18.

The flexible member 17 extends along the longitudinal axis of the head from the glabella area above the bridge of the nose to a point approximately one-half inch beyond the external occipital protuberance 108 (FIG. 10) on the posterior aspects of the neck, and the transverse extension member 18 extends from the parietal area 112 (FIG. 10) of one side to the parietal area of the other, but placed anterior to the external auditory meatus 109 (FIG. 10) and terminating about one and one-half inch above the zygoma 110 (FIG. 10) on either side. The longitudinal member 17 is designed to loosely contour the saggital or an anteroposterior axis of the head, and is separated from the scalp by means of foam rubber or plastic layers, or fluid-filled pads 26, 27 designed to adapt the longitudinal and transverse extension members more accurately to the contour of the skull and scalp. At the anterior and posterior aspects of this longitudinal member, the pad 27 may be somewhat denser so as to apply greater pressure to the area over the nasal process between the two supraorbital nerves and blood vessels 98 (FIG. 10) and the area surrounding the posterior aspects of the longitudinal extension member 18. Pad 27 is so designed that it will override the external occipital protuberance 108 (FIG. 10) and project on to the posterior surfaces of the neck that meets the external occipital protuberance. It will therefore serve as an anchor or limiting pad to prevent the longitudinal member 17 from sliding forward on the scalp itself. The longitudinal member consists essentially of two parts; an anterior portion 21 approximately 3 inches long which slides within the larger posterior portion 17 with a suitable adjustment 31 to compensate for differences in head lengths. This increase or decrease in anterior-posterior length of the longitudinal mounting framework contributes to the universality of fit as well as variations in the amount of pressure applied to the scalp and skull of the wearer. The underlying pads 26, 27 may be formed of various suitable materials designed to more accurately adapt the mounting framework to the wearer. In this embodiment the pads consist of two parts. The upper pad 26 is permanently attached to longitudinal member 17 and is of a stock thickness. The lower pad 27 can be of any desired thickness, and is varied in accordance with shape and size of an individual wearer. This provides an additional variable to insure universality of fit. The size and contour adjustment pressure is thus accomplished by the same anterior adjustable member 31 so that a comfortable fit is thus to be obtained. Attached to the posterior part of the rigid longitudinal member 19 is the size and contour adjustment 32. This consists of a spring-loaded pin, or lever 33 that engages a series of holes 34 or slots in a frame portion 36 attached to the underside of the longitudinal member 17. A similar frame portion 37 is pivotally attached at the anterior part of the mounting framework to the rigid member 19. The size or contour of the surface resting directly upon the head of the wearer is determined by the selection of particular holes 34. This adjustment can be better understood by reference to FIG. 5 which shows a schematic representation of the principle involved. Point A corresponds to the fixed pivotal attachment A of FIG. 3. Point B corresponds to the adjustable spring-loaded attachment B of FIG. 3. The rigid and flexible members are given the same reference numerals in both figures to avoid confusion. It can be easily seen that if the adjustable connection at point B is moved to the right and downward, it will cause the flexible member 17 to move upward toward the position indicated by dotted line C. Conversely, if the spring-loaded adjustment corresponding to point B is moved upward and to the left on the flexible member, the flexible member will be caused to straighten out toward the position indicated by the dotted line D. The anteroposterior fore-and-aft, or longitudinal fit, may be further affected by adjusting the front piece of the longitudinal portion of the helmet by means of the length adjustment 31 to more closely conform to the length of the head. Thus, the length as well as the contour or radius of curvature of an individual skull is compensated for by these two adjustments. The lateral curvature of the transverse extension member 18 may be changed by manually altering the size of the transverse member in the embodiment shown in FIGS. 1 through 4, or in the alternative as shown by FIGS. 7 and 8. The lateral extension members 18 may be provided with adjustment, using the identical principal shown by the schematic drawing of FIG. 5, to be described in detail.

Referring back to FIG. 3, several adjustments are possible by means of the slots or holes 34 being selectively engaged by the spring-loaded bar or plunger 33. This bar is lifted to free the back or posterior part of the flexible member of the mounting framework so that it is movable fore-and-aft within holes or slots 34. The front part of this flexible member 17 is pivotally attached to the mounting framework so that any movement of size or contour adjustment 32 of the back part of flexible member 17 produces an increase or decrease in the radius of the curvature and anteroposterior distance or size. An additional size adjustment is obtained by moving the adjustable member 26 of the longitudinal mounting framework. This sliding adjustment 31 also permits further adjustment to the visor 23 and noise shield and microphone assembly 22 to compensate for minor variations in head height and face size. The visor 23, noise shield, and microphone assembly 22 are mounted on the movable member 26 and can be individually adjusted or changed as needed. Since these component parts are all freely adjustable or movable, any combination of accessory units may be used with the mounting framework.

Figure 4:
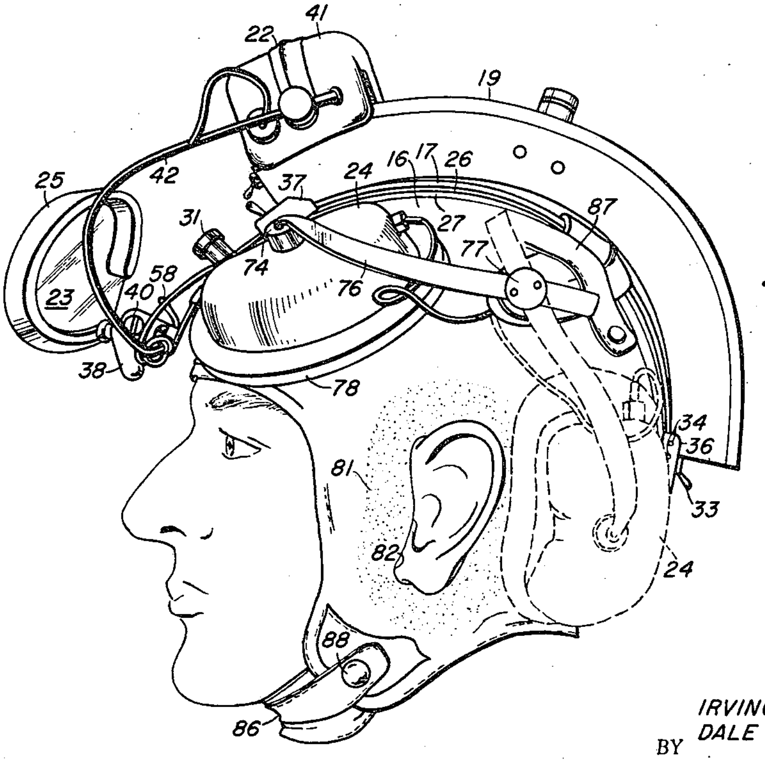
FIG. 4 shows the view of FIG. 3 with the microphone, visor, and earphones in standby position.
Figure 5:
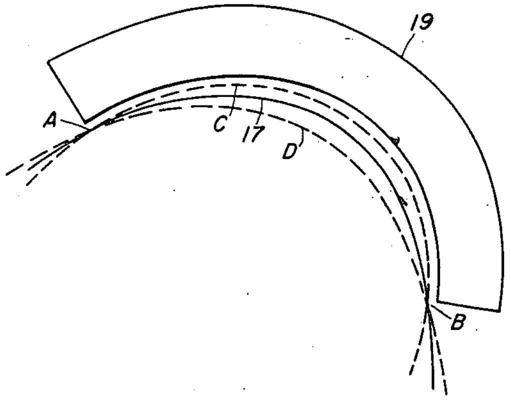
FIG. 5 is a schematic diagram illustrating the size and contour adjustment.

The visor 23 may be mounted by means of a hinge 38 on a universal type linkage 39 that allows movement in two planes. When in use, the visor is freely pressed against the periorbital structure, this pressure being evenly distributed by a rubber, plastic, or fluid seal 41. The lateral extent of the visor permits full peripheral vision as well as up and down. Minor contour adjustments may be made on the visor by manually bending the goggle framework. The framework is so mounted that it may be readily replaced by other types of visors to serve varying purposes in varying environments. As shown in FIG. 4, the visor 23 may also be turned up part way to serve as a glare shield or sun reflector. In the full stand-by position, the visor can be rotated upward to the point that contact is made with the transceiver housing 19. The tension of the universal joint 40 maintains the visor in any desired position.

The noise shield 41 when in use, contacts the perioral area and contains a noise cancellation microphone. A "push-to-talk" button 45 is positioned on the front side of noise shield 41. This positioning has a dual purpose. The first, of course, is to provide a readily accessible location whereby the button is found by automatic reaction, i.e., no time is lost "feeling" for the button. The second function of this location is to enhance the noise seal made by the contact of the noise shield 41 around the perioral area. Thus, the microphone assembly 22 can be adjusted to make light physical contact with the wearer, since on transmitting, a close seal is necessarily made when the "push-to-talk" button 45 is depressed thereby pushing the assembly 22 in firm physical contact with the wearer. The position of the shield and microphone assembly 22 can be varied by sliding it along a boom 42 on either side. Two ball and socket type joints 50 suspend the noise shield 41 so that movement in all three planes may be obtained. The supporting boom 42 of the shield and microphone assembly 22 is wide in the temple areas to avoid the visor 23 and be lateral to the fields of peripheral vision. As shown in FIGS. 6*a*, and 6*b*, a clamp is employed to permit adjustment of the microphone boom 42. The clamp consists of a rectangular block 43 having end faces 44, 46, side faces 47, 48, upper face 49 and lower face 51. As can be seen, lower face 51 has a semi-circular cut-away portion 52. Cut-away portion 52 has a counterbore 53 and passing outwardly from counterbore 53 to side face 48 is a threaded hole 54. A clamping piece 56 fits into counterbore 53. Integral with clamping piece 56 and passing through threaded hole 54 is a threaded member 57 with an extension handle 58. Rectangular block 43 has two tapped holes passing through from upper surface 49 to lower face 51 where, by means of screws 59, block 43 is mounted on longitudinal extension 21 (FIG. 1), microphone boom 42 can be easily affected by the wearer by unscrewing threaded member 47, adjusting the mike boom 42 to the desired position, and screwing threaded member 57 tightly in.

Referring now to FIGS. 7 and 8 in detail the modification incorporating the size and contour adjustments of the transverse extension member is shown which is indentical in principle to the adjustments of the longitudinal member 17. In this embodiment, the transverse extension 18 is also constructed of a resilient material. A rigid transverse member 61 is attached to the flexible member 18 at F by rivets or other conventional means, such as spot welding. As the apparatus is symmetrical, one side will be described only, as illustrated, in the interest of simplicity, it being understood that there are identical elements and adjustments on each side. The rigid horizontal member 61 is terminated in a threaded end 62. Attached to the flexible member 18 is a hollow mounting block 63 with a bore 64 for receiving rotatable fittings 65 (FIG. 2), and a threaded bore 66 for receiving a screw 67. Screw 67 is equipped with a clevis 68 having eyes 69. Fitting into the clevis 68 of screw 67 is threaded member 71 with an eye 72. These elements are pivotally secured by means of a connection through their aforementioned eyes. Turnbuckle 73 is threadably engaged with threaded member 71 and the threaded end 62 of rigid member 61. It will be understood at this point that rotating the turnbuckle 73 will result in an overall change of length of the rigid member 61 and thus force a resulting change in the radius of curvature and contour of the flexible member 18. In the embodiment of FIGS. 1 through 4, additional fit and stability is provided by the ear defenders 24 as they contact the lateral aspects of the head, particularly in relation to the ear and mastoid areas. This adjustment accomplishes the result of adjusting the contour and size by changing the arc or radius of curvature of the flexible member of the mounting framework as set out above.

As shown in FIGS. 3 and 4, the ear defenders 24 are mounted by means of a centrally located ball joint 74 to a spring tension suspension member 76, which, in turn, is mounted through a slide-swivel joint 77 to the mounting block 63 on the lateral extension member 18. The central position of the ball joint 74 distributes the pressure evenly around the ear from the spring suspension member 76. These features, in addition to providing a good acoustic seal, lends considerable lateral support to the entire helmet in conjunction with the lateral extension members 18. The rims 78 of the defenders 24 insure a good acoustic seal (FIG. 4). This latter feature will be further described in more detail.

The pliable head covering 16 is preferably constructed of canvas or plastic. A better acoustic seal about the ears is obtained by impregnating the side panels 81 of the cloth helmet 16 with latex or plastic. An opening 82 is cut out of this impregnated panel in the region of the ear to permit the ear to protrude through the pliable covering into the ear defenders 24. These impregnations also lend enough body to the head covering to obviate the necessity for ridging or lining the edge of apertures 82, i.e., the edges resist the tendency to curl or fringe. The head covering as illustrated is held in place by a chin strap 86. Mounting straps 87 are provided for holding the longitudinal flexible member 17 and the transverse extensions 18 thereof. These straps 87 are shown with snap fittings 88, but any conventional fastening means may be employed.

In general, the mass and weight of the helmet are distributed physiologically and functionally over the head and neck in order to be well tolerated by the wearer. The weight of the helmet and associated equipment mounted on or attached to it, is distributed so that the center of weight and gravity falls over the atlanto-occipital articulation and upper end of the vertebral column in a longitudinal axis. This tends to minimize the physiological need for increased tonic contraction of the sternomastoid, trapezius and erecter spinalis muscles to maintain increased tonus and partial contraction to maintain the head in an erect position. This additional weight of the helmet and associated equipment is balanced with its center over the most cephaltic part of the vertebral column. Movements of the head and neck are therefore not inhibited and a minimum of muscular activity is required to produce the normal movement of the head and neck.

Referring in detail to FIGS. 9–11, the mounting of the support for the visor 23 and microphone assembly 22 (FIG. 1) are at the forward end of the mounting framework, and these, in turn, are counter-balanced by a transceiver and batteries located in the hollow rigid member 19. The batteries are placed as far aft in the enclosure as possible so that the center of weight mass or gravity of the helmet and associated equipment lies at a relatively low level above the axis and atlas 91 at approximately the atlanto-occipital articulation 92. This low center of gravity allows the wearer to be relatively unaffected by the weight of the helmet and equipment. The sternomastoid 93 and trapezius muscles 94 can thus remain in a relaxed position and permit the carrying of this additional load with a minimum of fatigue setting in.

The visor 23 (FIG. 1) is mounted from the front or anterior part of the mounting framework. It utilizes a fluid or plastic pressure seal 41 (FIG. 1) against the supraorbital area, the nasal process, infra-orbital ridge and vessels 96, and zygomatic arch 97. This wide distribution of pressure thus provides a good seal against bony land marks and avoids excessive pressure against the infra-orbital and supraorbital nerves and blood vessels 96 and 98. The facial arteries 99 and veins 101 are thus avoided by using bony ridges for support. A noise cancelling microphone is mounted within the noise shield 41 that contacts the perioral area. The noise shield 41 applies light pressure against the mandible anterior 102, and above the termination of the mental nerve. The area of contact is spread over a wide surface so that no excessive pressure is brought to bear on the mandible 102 or facial artery 99 and vein 101.

The ear defenders and receivers 24 also take advantage of the extensive contact surface to distribute pressure exerted against the head in order to obtain a good acoustics seal. The defenders rest against the posterior aspects of the zygogmatic arch 97 and the superficial temporal vessels 106, and the mastoid process 103. The major nerve and vessels are not compressed, although their terminal branches may be covered by the fluid seal defender. The facial nerve 104 lies at a deeper level, and therefore, is not affected. The defenders and receivers as additional equipment add some weight to the helmet, this weight lies on a horizontal axis passing through the atlanto-occipital articulation 92 or center of rotation of the head upon the neck, and therefore, causes no additional strain to the muscles of the neck.

As previously stated, the longitudinal member 17 rests on the head between the supraorbital vessels 107 at the anterior aspect and at the posterior aspect the longitudinal member 17 will override the external occipital protuberance 108 and project onto the posterior surfaces of the neck beneath the external occipital protuberance 108. The lateral member 18 extends transversely from the longitudinal member 17 and lies anterior to the external auditory meatus 109 but posterior to the mid-point of the skull and faces obliquely forward in order to parallel the superficial temporal vessels 106. This member conforms to the lateral or transverse contour of the scalp and skull and is separated from the skull by either fluid-filled layers or pads of sponge or foam rubber, or similar plastic to accommodate the mounting framework to the skull's contour which can be extensions of the pads disposed between the longitudinal member and the head covering. The transverse extension member can be manually formed or adjusted to accurately conform to the lateral or transverse contour of the head.

Since the transverse extension member lies anterior to the external auditory canal where the superficial temporal vessels 106, temporal muscles and facial nerve branches 104 lie, pressure will not be applied to these structures, and freedom of anatomical and physiological action results. The transverse extension member 18 of the mounting framework also lies anterior to the occipital vessels 110 and lesser occipital nerve 111, so that no pressure is brought to bear on these structures. The padding beneath the transverse member 18 contacts the parietal area 112 of the head in a non-vital area, thus permitting long comfortable wearing of the helmet. This position of the transverse extension member 18 also permits placing the ear defenders 24 in a stand-by position over the occipito-mastoid or temporal-frontal area. The receivers within the ear defenders are thus functional in the stand-by position, utilizing air borne transmission and bone conduction through the mastoid process 103 or temporal-frontal bone 113. These stand-by positions are illustrated in FIG. 4.

It is seen that the actual weight supporting mounting framework of this helmet does not overlie any of the major anatomical structure enervating the scalp or supplying the scalp with blood. Physiological and anatomical interference such as ischemia, therefore, does not occur, and normal activity is present. Thus comfortable wearing of the helmet for extended periods of time results without loss of efficiency or fatigue.

It should be understood that the foregoing disclosure related only to a particular communications embodiment of the invention. This invention is not restricted to use in noise attenuation or radio communications, but is susceptible to use in any supporting application especially where a mounting support is required, as for example: In head restraint; in the medical field for the support of a head mirror or light; in the diving or aviation field for the support of visors, face masks and breathing apparatus; or modified for helmet use. It is also pointed out that the longitudinal members permit attachment of a restraint mechanism to limit the range of movement of the head and neck to a non-traumatic extent, i.e., in sudden decelerations that result in whiplash injuries.

Obviously many modifications and variations of the present invention are possible in the light of the above teachings. It is therefore to be understood that within the scope of the appended claims the invention may be practiced otherwise than as specifically described.

What is claimed is:

1. In a helmet of the type carrying auxiliary equipment the improved mouthpiece apparatus comprising a mounting block carried by the portion of the helmet adapted to fit over a wearer's forehead, a supporting boom, adjustably swingably mounted on said mounting block, said boom being substantially U-shaped with the middle portion of said boom mounted on said mounting block and with the terminal ends of said boom adapted to terminate on each side of a wearer's mouth, a mouthpiece, and means attaching the terminal ends of said boom slidably and pivotally to opposite ends of said mouthpiece.

2. The improved mouthpiece assembly of claim 1 including adjustable, releasable clamping means carried by said mounting block for locking said boom in any selected position.

3. The improvement of claim 1 wherein said last mentioned means comprises a latching member slidably carried by each of the terminal ends of said boom, said mouthpiece being connected at each side thereof to said respective latching members through a ball and socket joint.

4. The improved mouthpiece assembly of claim 3 including adjustable, releasable clamping means carried by said mounting block for locking said boom in any selected position.

No references cited.